July 10, 1951            D. H. MITCHELL            2,560,121
RADIO RECEIVER FOR MULTIPLE SIGNALS
Filed Sept. 6, 1945
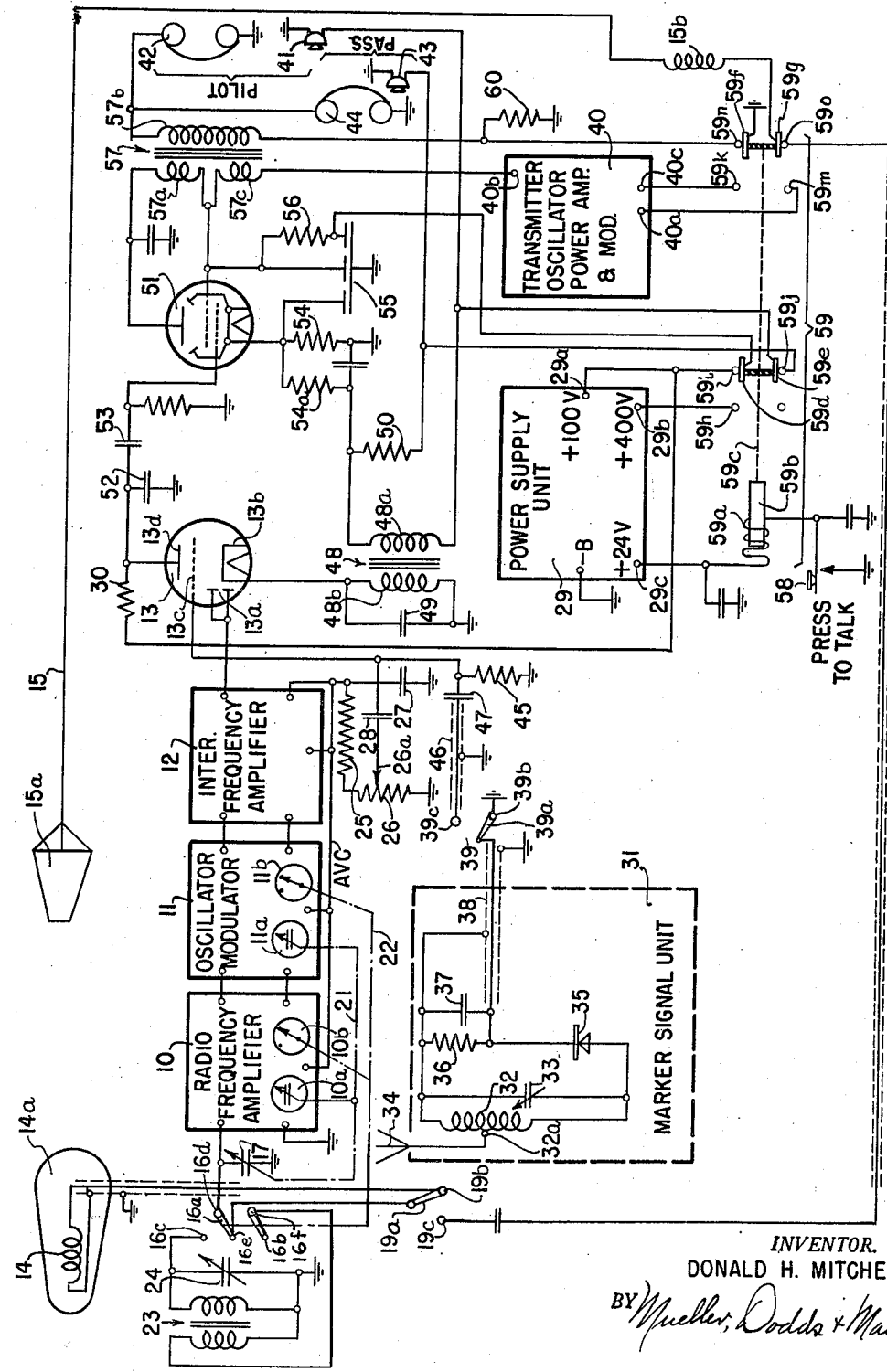
INVENTOR.
DONALD H. MITCHELL
BY *Mueller, Dodds & Mason*
ATTORNEYS

UNITED STATES PATENT OFFICE 2,560,121

RADIO RECEIVER FOR MULTIPLE SIGNALS

Donald H. Mitchell, Chicago, Ill., assignor to Motorola, Inc., Chicago, Ill., a corporation of Illinois Application September 6, 1945, Serial No. 614,641

10 Claims. (Cl. 250—13)

This invention relates to aircraft radio receivers and, while it is of general application, it is particularly suitable for embodiment in a transmitter-receiver system including a selecting system for translating either broadcast signals for entertainment or beacon and marker signals for navigational purposes.

Heretofore, in order to provide for the proper navigation of aircraft and to provide for the reception of broadcast signals for entertainment, it has been necessary to equip an aircraft with at least two complete receivers, one adapted to receive the broadcast band and the beacon band of the order of 200–410 kc. and one for the reception of marker signals at 75 mc. transmitted as a vertical beam by a transmitter located at each airport in order to identify and locate the air port for pilots flying by instruments. Also, in certain receivers, provisions have been made for utilizing the audio-frequency portion of the receiver as a part of an intercommunicating system but in such arrangements provisions have always been included for disabling the transmitter or the receiver, or both, while intercommunicating and also have included complicated switching mechanisms for this purpose. On the other hand, it is highly desirable to provide an aircraft transmitter-receiver system including provisions for receiving broadcast entertainment signals, beacon signals, and marker signals as well as operating as a portion of an intercommunicating system, the system being capable of all of such operations simultaneously with a minimum of interference and a minimum of switching.

It is an object of the invention, therefore, to provide a new and improved aircraft radio receiver which is effective to overcome one or more of the above-mentioned limitations and shortcomings of such receivers of the prior art.

It is another object of the invention to provide a new and improved aircraft radio receiver in which voice signals, for example broadcast signals and marker signals, may be simultaneously received and in which, at the same time, the audio-frequency portion of the receiver serves as a portion of an intercommunicating system.

It is another object of the invention to provide a new and improved transmitter-receiver system including a receiver of the type described in which the operating condition of the system may be changed from receiving to transmitting without impairing the function of the system for the reception of marker signals or in serving as an intercommunication system.

In accordance with the invention, an aircraft radio receiver comprises a voice-signal carrier-frequency selecting, amplifying and detecting first portion, an auxiliary marker-signal carrier-frequency selecting and detecting second portion, and at least one and preferably two or more intercommunicating microphones. The receiver also includes an audio-frequency amplifier having input and output electrodes, a circuit for applying to the input electrodes a voice signal translated by the first portion, a circuit for selectively simultaneously applying to the input electrodes a marker signal translated by the second portion, and a circuit for simultaneously applying to the input electrodes a signal from the microphone. The receiver also includes a signal reproducer coupled to the output electrodes of the amplifier, whereby the amplifier and reproduced serve simultaneously for the translation of received voice signals, marker signals and intercommunication signals. In a preferred embodiment of the invention, the system also serves as a transmitter and includes means for selectively coupling the output electrodes of the amplifier to a carrier-frequency oscillator-modulator and power amplifier portion, whereby the audio-frequency amplifier also serves as a modulation amplifier for the microphone while the system operates as a transmitter.

Further in accordance with the invention, an aircraft radio receiver comprises a voice-signal carrier-frequency selecting, amplifying and detecting first portion, an auxiliary marker-signal carrier-frequency selecting and detecting second portion, and an audio-frequency amplifier having input and output electrodes. The receiver also includes a circuit for applying to the input electrodes a voice signal translated by the first portion, a circuit for selectively simultaneously applying to the input electrodes a marker signal translated by the second portion, and a signal reproducer coupled to the output electrodes, whereby the amplifier and reproducer serve simultaneously for the translation of received voice signals and marker signals.

Further in accordance with the invention, an aircraft radio receiver comprises a voice-signal carrier-frequency selecting, amplifying and detecting first portion, at least one and preferably a plurality of intercommunicating microphones, and an audio-frequency amplifier having input and output electrodes. The receiver also includes a circuit for applying to the input electrodes a voice signal translated by the first portion, a circuit for simultaneously applying to the input electrodes a signal from the microphone, and a signal reproducer coupled to the output electrodes, whereby the amplifier and reproducer serve simultaneously for the translation of voice signals and intercommunication signals.

For a better understanding of the invention, together with other and further objects thereof, reference is had to the following description taken in connection with the accompanying drawings, while its scope will be pointed out in the appended claims.

Referring now to the drawing, the single figure is a circuit diagram, partially schematic, of an aircraft radio transmitter-receiver system embodying the invention.

Referring now to the drawing, there is represented a circuit diagram, partially schematic, of an aircraft transmitter-receiver system. This system comprises a voice-signal carrier-frequency selecting, amplifying and detecting first portion including, in cascade, a radio-frequency amplifier 10, an oscillator-modulator 11, an intermediate-frequency amplifier 12 and the diode anodes 13a and cathode 13b of a duo-diode-triode vacuum tube 13. The units 10, 11 and 12 may be of conventional construction and operation and are hence illustrated schematically. The input terminals of the radio-frequency amplifier 10 are adapted to be selectively connected to a high-inductance high-Q aircore loop 14, preferably enclosed in an airfoil surface 14a, or, through a transmitting antenna loading coil 15b, to a retractable trailing antenna 15 having a conical drag 15a. To this end, there is provided a manually operable antenna switch having a movable contact 19a connected to an input terminal of the unit 10 and stationary contacts 19b, 19c connected to the loop 14 and antenna 15, respectively.

The units 10 and 11 are indicated schematically as including adjustable tuning elements 10a and 11a, respectively, which are connected with an antenna-tuning condenser 17 by way of a mechanism indicated schematically at 21 for unicontrol tuning of the apparatus.

The portion of the receiver including the units 10, 11 and 12 is preferably designed for operation over the beacon band of 200-410 kc. and the broadcast band of 550-1500 kc. To this end, there is provided in the input circuit of the unit 10 a band switch 16 which is connected for unicontrol with band switches 10b and 11b of the units 10 and 11, respectively, by a mechanism indicated schematically at 22. The band switch 16 is provided with movable bridging contacts 16a and 16b and stationary contacts 16c, 16d, 16e and 16f. The switch 16 is illustrated in position for operation in the beacon band in which the loop antenna 14 is connected across the input circuit of the unit 10 through the bridging contact 16a and the stationary contacts 16d and 16e.

For operation in the broadcast band, the switch 16 is operated to its uppermost dotted-line position, in which the input circuit of the unit 10 is connected through the bridging contact 16a and the stationary contacts 16c and 16d across the secondary winding of an impedance-matching transformer 23, while the primary winding of this transformer is connected through the bridging contact 16b and the stationary contacts 16e and 16f to the loop antenna 14 or the trailing antenna 15, in accordance with the position of the switch 19. An adjustable condenser 24 may be connected across the secondary winding of transformer 23 to tune the loop 14 approximately to the low-frequency end of the broadcast band.

The output circuit of the intermediate-frequency amplifier 12 is connected to the detector comprising the electrodes 13a and 13b and a load circuit including a fixed resistor 25 in series with a volume-control resistor 26 across which are connected a filter condenser 27. The resistor 26 is provided with a manually adjustable contact 26a which is connected through a coupling condenser 28 to the input electrode or grid 13c of vacuum tube 13 in a conventional manner. The unidirectional component of the signal across the load circuit 25, 26, 27 is also applied as an automatic amplification control bias by way of the "A. V. C." lead to the control electrodes of one or more of the tubes of the units 10, 11, and 12 in a conventional manner. The anode 13d of the tube 13 is supplied from a suitable source of space current, such as the 100-volt tap 29a of a power supply unit 29, through a load resistor 30.

So much of the transmitter-received described is substantially conventional in construction and operation so that a detailed explanation of its operation is deemed unnecessary. Briefly, received carrier-frequency voice signals intercepted by the loop antenna 14 or the trailing antenna 15, depending upon the setting of the antenna switch 19, are impressed upon the radio-frequency amplifier 10 in which they are selected and amplified and translated to the oscillator-modulator 11 wherein they are converted into an amplified intermediate-frequency carrier signal and from which they are applied to the intermediate-frequency amplifier 12 for further selection and amplification. The intermediate-frequency signal is detected in the circuit including the electrodes 13a and 13b to develop across the load circuit 25, 26 the modulation or voice-signal components. This signal, at an appropriate volume determined by the setting of the adjustable contact 26a, is amplified by the audio-frequency amplifier tube 13 which develops at its output electrode or anode 13d an amplified voice signal for utilization as described hereinafter.

It will be understood that any desired signal in the broadcast or beacon band may be selected by operation of the unicontrol tuning mechanism 21 for adjusting the tuning condenser 17 and the tuning elements 10a and 11a of the units 10 and 11, respectively. Selection of signals in the beacon band or broadcast band may be effected by adjustment of the band-switch mechanism 22, which is effective to switch from one band selector to another in the units 10 and 11 and, when switching to operation in the broadcast band, to interpose the impedance-matching transformer 23 between the antenna circuit and the input circuit of the unit 10 to step down the high impedance of the loop 14 to match the impedance of the input circuit of the unit 10.

The transmitter-receiver system of the invention also includes an auxiliary marker-signal carrier-frequency selecting and detecting portion 31 consisting of a carrier-frequency selector comprising an auto-transformer winding 32 and a tuning condenser 33 proportioned to tune to the marker-signal frequency, presently at 75 mc. The winding 32 is provided with an intermediate contact 32a which is connected to an antenna 34, preferably in the form of a quarter-wave-length whip or rod. Across the tuned circuit 32, 33 is connected a contact-rectifier detector consisting of a crystal or other contact rectifier 35 in series with a load circuit comprising a resistor 36 and a filter condenser 37 in parallel. The detected marker-signal output from the unit 31 is taken out through a shielded or concentric cable 38 and impressed on a movable contact 39a of a manually operable switch 39 having fixed contacts 39b and 39c. The switch 39 is illustrated in the position in which the output signal of the marker-signal unit 31 is grounded or short-circuited.

The transmitter-receiver system of the invention also includes a carrier-frequency oscillator-modulator and power-amplifier portion, or unit 40, which may be entirely conventional in construction and operation and is therefore shown schematically. The unit 40 is provided with a radio-frequency output terminal 40a, a B+ and modulation-signal input terminal 40b and a common cathode terminal 40c for the several tubes comprised within the unit 40. This unit may be designed to operate at any allocated frequency, for example 3 mc.

The system also includes a plurality of intercommunicating stations, each including a microphone and a signal reproducer, for example a pilot station including a pilot microphone 41 and earphones 42 and one or more passenger's stations, each including a microphone 43 and earphones 44.

It will be seen that the connection from the volume control contact 26a to the input electrode 13c of the audio-amplifier tube 13 comprises a circuit for applying to the input electrodes 13c, 13b of the tube 13 a voice signal translated by the portion of the system including the units 10, 11 and 12. Across this circuit is connected an impedance element such as a resistor 45, having a value of a higher order of magnitude than the maximum impedance of the input circuit to the amplifier 13 just described. The system also includes a circuit for selectively simultaneously applying to the input electrodes 13c, 13b a marker signal translated by the unit 31. This circuit means includes the switch 39, described above, for selectively applying a marker signal translated by the unit 31 across the impedance element 45 through a shielded or concentric line 46 and a coupling condenser 47.

The system of the invention also includes a circuit for simultaneously applying to the input electrodes of the vacuum tube 13 signals from all of the microphones 41, 43 of the several intercommunicating stations. For example, the microphones 41 and 43 are effectively connected in parallel through a transmitting switch, described hereinafter, to a circuit including a low-impedance coupling element connected in series with the cathode electrode 13b of the amplifier 13. Specifically the microphones 41 and 43 are effectively connected in parallel across a primary winding 48a of a unity-ratio transformer 48 having a secondary winding 48b connected between the cathode 13b and ground and provided with a fixed tuning condenser 49 for improving the audio-frequency response of the transformer. Preferably one of the windings of the transformer 48, for example the primary winding 48a, is loaded with a resistor 50 of a low value.

The transmitter-receiver system of the invention also includes circuit means for coupling all of the signal reproducers, specifically the earphones 42 and 44, to the output electrodes 13b, 13d of the audio-frequency amplifier 13. This circuit means may be of any suitable type but there is illustrated by way of example a beam-power amplifier 51 having its input electrodes coupled to the anode 13d of amplifier 13 through a conventional resistance-capacitance circuit 52, 53. Included in the cathode circuit of the tube 51 is a cathode-bias resistor 54 by-passed by a section of a multi-section filter condenser 55. The unidirectional component of the potential across bias resistor 54 is applied by way of an isolating resistor 54a and resistor 50 as an operating potential for the microphones 41 and 43. Screen and anode potentials are supplied to the tube 51 through a load resistor 56 shunted by a section of the filter condenser 55 and through contacts of the transmitting switch, described hereinafter, from a suitable power output terminal of the unit 29. Included in the output circuit of the beam-power tube 51 is a primary winding 57a of a power-output transformer 57 having a secondary winding 57b connected directly to the earphones 42 and 44 through a series loading resistor 60, short-circuited during reception by the transmitting switch described hereinafter. The transformer 57 is also provided with a second output winding 57c connected to the radio-frequency input terminal 40b of the unit 40.

The system so far described is that of the receiving portion of the system. When so connected the system operates in a conventional manner to translate voice signals from the portion of the system including the units 10, 11 and 12 through the amplifier 13, the power amplifier 51, and the output transformer 57 directly to the signal reproducers 42 and 44. At the same time, by operation of the contact 39a of switch 39 to engage the contact 39c, marker signals derived from unit 31 are impressed across the resistor 45 in the input circuit of the amplifier 13, whereby they are amplified in a manner entirely similar to the voice signals and impressed upon the earphones 42 and 44. Further, with the system connected as described, either the pilot or any of the passengers may talk into his respective microphone 41, 43 and these intercommunication signals are injected through the low-impedance coupling transformer 48 into the cathode circuit of the amplifier 13 and amplified therein and in the power amplifier 51 in a similar manner and impressed upon all of the earphones 42 and 44. Due to the fact that the resistor 45 is of a higher order of magnitude, preferably three times the highest value of the impedance of the remaining portion of the input circuit of the amplifier 13, and due to the high impedance of the load circuit 36, 37 of the marker-signal unit, this connection of the marker-signal unit 31 to the input electrodes of amplifier 13 has no appreciable effect on the operation of the receiver to received voice signals, so that the marker receiver 31 may be connected or disconnected across the resistor 45 without materially affecting the operation of the receiver. Further, due to the extremely low impedance of the coupling transformer 48 connected in the cathode circuit of the amplifier 13, the variation of impedance of this circuit reflected from the microphones 41 and 43 during operation is negligible in comparison with the anode-cathode impedance of the amplifier 13, so that there is an inappreciable coupling between the normal voice-signal translating circuit and the intercommunication circuit. Further, the low impedance of the transformer 48 and the low resistance of its secondary winding 48b avoids substantial degeneration of the audio-frequency signal detected by the diodes 13a. That is, the amplifiers 13 and 51 and the signal reproducers 42 and 44 serve simultaneously for the transmission of voice signals, marker signals and intercommunication signals, without mutual interference, while the system is operating as a receiver.

The transmitter-receiver system of the invention also includes means for modifying the connections of the system described, which constitute a receiving system, to adapt the circuit for signal transmission without impairing its performance as a marker-signal receiver or as an intercommunication system. To this end, there is provided a press-to-talk key 58 which is connected to complete the circuit of an operating coil 59a of a transmitting switch or relay 59, the winding 59a being energized from a power-supply terminal 29c of the power-supply unit 29 which may, for example, supply 24 volts D. C. The relay 59 is provided with an armature 59b which, through a link 59c, is adapted to operate two pairs of sliding contacts 59d, 59e and 59f, 59g. The relay 59 is also provided with a series of fixed contacts 59h–59o, inc. The switch 59 is illustrated in its de-energized position in which the several circuits are completed for operation of the system as a receiver, as described above.

The operation of the press-to-talk key 58 to actuate the relay 59 is effective to perform a number of operations simultaneously:

(a) Through the contacts 59k and 59f the common cathode terminal 40c of the unit 40 is grounded, thus completing the energization of the circuits for the several tubes of the unit 40, so that this unit operates in a conventional manner to develop a carrier-signal output at the terminal 40a which is impressed through the contacts 59m and 59g on the trailing antenna 15, operating as a transmitting antenna. Any communication signals from the pilot's microphone 41 will be impressed through the coupling transformer 48 upon the input electrodes of the amplifier 13, amplified therein and impressed upon the power amplifier 51, in which they are further amplified and applied through the output winding 57c of transformer 57 upon the modulation input terminal 40b of the unit 40. That is, the switch contacts 59f and 59k effectively couple the output electrodes of the audio-frequency amplifier 13 to the transmitting portion 40 of the system by completing the cathode-ground connections of the tubes of unit 40.

(b) Simultaneously, the opening of the contacts 59e and 59j opens the circuit to the loading resistor 50 across coupling transformer 48, simultaneously to increase the impedance of this coupling element for increasing the gain of the amplifier 13 to the signals from the pilot's microphone 41. This provides a modulation signal of higher amplitude to the input terminal 40b of the unit 40, which is desirable for most effective modulation during transmission. On the other hand, during operation of the apparatus as a receiver or as an intercommunicating apparatus, it is desirable to maintain the intercommunication signal at a relatively low level in the output of the amplifiers 13 and 51 in order not to overload the earphones 42, 44 or interfere unduly with the reception of marker signals and this is effected by the low-impedance resistor 50 in shunt to the coupling transformer 48.

(c) Simultaneously, opening of the circuit at the contacts 59f, 59n removes the short-circuit around resistor 60 and effectively connects this impedance device in series with the secondary winding 57b of output transformer 57 and in series with the signal reproducers 42 and 44 for attenuating the output signals of the amplifier as applied to the earphones 42 and 44. This feature is desirable in order to avoid excessively loud signals in earphones 42 and 44 from the pilot's microphone 41 or from the marker-signal unit 31 due to the increase in gain of the amplifier 13 for communication signals, as described above.

(d) Simultaneously, at the contacts 59e, 59j the circuit is broken for the passenger's microphone 43 and for all similar microphones other than that of the pilot so that they are disconnected from the system, permitting only the pilot to talk during transmitting operation.

(e) Operation of the switch 59 also is effective to connect the screen and anode of the beam-power amplifier tube 51 through the contacts 59d and 59h to the high-voltage supply terminal 29b, which may supply, for example 400 volts, still further to increase the gain of the power amplifier tube 51 during transmission.

Thus, there is provided a transmitter-receiver system which while connected for transmitting, still permits the reception of marker signals from unit 31 and still permits reception of voice signals through the normal receiving channels including units 10, 11 and 12 and further permits the pilot to communicate through his microphone 41 with the other intercommunicating stations, such as passenger stations including the earphone 44, the entire changeover from receiving to transmitting being effected by operation of the single press-to-talk key 58.

It is also seen that the amplifiers 13 and 51, in addition to serving as audio-frequency amplifiers during reception, also serve during transmission as a high-gain modulation amplifier for the pilot's microphone 41, that the sidetone signals translated to the signal reproducers 42 and 44 are attenuated, and that all of the intercommunicating microphones, with the exception of the pilot's microphone 41, are disabled while the system is operating as a transmitter.

While it will be understood that the design constants of the transmitter-receiver system of the invention will vary within wide limits in accordance with the particular operating and performance requirements, there follow by way of example certain of the principal design constants of an amplifier stage 13, 51 in a particular transmitter receiver embodying the invention found to have the desirable operating characteristics described above:

| | |
|---|---|
| Amplifier 13 | Type 12SQ7 |
| Amplifier 51 | Type 6V6 |
| Transformer 48 | Unity ratio, 30 ohms resistance, 50 ohms impedance at 400 cycles |
| Resistor 45 | 3 megohms |
| Resistor 50 | 20 ohms |
| Resistor 60 | 5000 ohms |
| Resistor 54 | 300 ohms |
| Resistor 54a | 1000 ohms |

While there has been described what is at present considered to be the preferred embodiment of the invention, it will be apparent to those skilled in the art that various changes and modifications may be made therein without departing from the spirit or scope of the invention.

What is claimed as new is:

1. A radio transmitter-receiver system comprising, a voice-signal carrier-frequency selecting amplifying and detecting first portion, an auxiliary carrier-frequency selecting and detecting second portion, a modulator and power amplifier third portion, at least one intercommunicating microphone, an audio-frequency amplifier having input means and output means, a circuit for applying to said input means a voice signal translated by said first portion, a circuit for selectively simultaneously applying to said input means a signal translated by said second portion, a circuit for simultaneously applying to said input means a signal from said microphone, a signal reproducer coupled to said output means, and means for selectively coupling said output means to said third portion, whereby said amplifier serves as a modulator amplifier for said microphone while said system is operating as a transmitter.

2. An aircraft radio transmitter-receiver system comprising, a voice-signal carrier-frequency selecting, amplifying and detecting first portion, an auxiliary marker-carrier-frequency selecting and detecting second portion, a carrier-frequency oscillator, modulator and power-amplifier third portion, at least one intercommunicating microphone, an audio-frequency amplifier having input means anad output means, a circuit for applying to said input means a voice signal translated by said first portion, a circuit for selectively simultaneously applying to said input means a marker signal translated by said second portion, a circuit for simultaneously applying to said input means a signal from said microphone, a signal reproducer coupled to said output means, whereby said amplifier and reproducer serve simultaneously for the translation of received voice signals, marker-signals and intercommunication-signals, and means for selectively coupling said output means to said third portion, whereby said amplifier serves as a modulation amplifier for said microphone while said system is operating as a transmitter.

3. An aircraft radio receiver comprising, a voice-signal carrier-frequency selecting, amplifying and detecting first portion, at least one intercommunicating microphone, an audio-frequency amplifier having input, output and cathode electrodes, a circuit for applying to said input electrode a voice signal translated by said first portion, a circuit for simultaneously applying to said cathode a signal from said microphone, and a signal reproducer coupled to said output electrode, whereby said amplifier and reproducer serve simultaneously for the translation of voice signals and intercommunication-signals.

4. An aircraft radio receiver comprising, a voice-signal carrier-frequency selecting, amplifying and detecting first portion, at least one intercommunicating microphone, an audio-frequency amplifier having input, output and cathode electrodes, a circuit for applying to said input electrode a voice signal translated by said first portion, a circuit including a low-impedance coupling element connected in series with said cathode electrode for simultaneously applying to said amplifier a signal from said microphone, and a signal reproducer coupled to said output electrode, whereby said amplifier and reproducer serve simultaneously for the translation of voice signals and intercommunication-signals.

5. An aircraft radio receiver comprising, a voice-signal carrier-frequency selecting, amplifying and detecting first portion, at least one intercommunicating microphone, an audio-frequency amplifier having input, output and cathode electrodes, a circuit for applying to said input electrode a voice signal translated by said first portion, a circuit including a unity-ratio low-impedance transformer connected in series with said cathode electrode for simultaneously applying to said amplifier a signal from said microphone, and a signal reproducer coupled to said output electrode, whereby said amplifier and reproducer serve simultaneously for the translation of voice signals and intercommunication-signals.

6. An aircraft radio transmitter-receiver system comprising, a voice-signal carrier-frequency selecting, amplifying and detecting first portion, a carrier-frequency oscillator, modulator and power amplifier second portion, at least one intercommunicating microphone, an audio-frequency amplifier having input means and output means, a circuit for applying to said input means a voice signal translated by said first portion, a circuit for simultaneously applying to said input means a signal from said microphone, a signal reproducer coupled to said output means, whereby said amplifier and reproducer serve simultaneously for the translation of voice signals and intercommunication-signals, and means for selectively coupling said output means to said second portion and for simultaneously increasing the gain of said amplifier to microphone signals, whereby said amplifier serves as a modulation amplifier for said microphone while said system is operating as a transmitter.

7. An aircraft radio transmitter-receiver system comprising, a voice-signal carrier-frequency selecting, amplifying and detecting first portion, a carrier-frequency oscillator, modulator and power amplifier second portion, at least one intercommunicating microphone, an audio-frequency amplifier having input means and output means, a circuit for applying to said input means a voice signal translated by said first portion, a circuit for simultaneously applying to said input means a signal from said microphone, a signal reproducer coupled to said output means, whereby said amplifier and reproducer serve simultaneously for the translation of voice signals and intercommunication-signals, and means for selectively coupling said output means to said second portion and for simultaneously increasing the gain of said amplifier to microphone signals and attenuating the output signals thereof as applied to said reproducer, whereby said amplifier serves as a modulation amplifier for said microphone while said system is operating as a transmitter.

8. An aircraft radio transmitter-receiver system comprising, a voice-signal carrier-frequency selecting, amplifying and detecting first portion, a carrier-frequency oscillator, modulator and power amplifier second portion, at least one intercommunicating microphone, an audio-frequency amplifier having input, output and cathode electrodes, a circuit for applying to said input electrode a voice signal translated by said first portion, a circuit including a low-impedance coupling element connected in series with said cathode electrode for simultaneously applying to said amplifier a signal from said microphone, a signal reproducer coupled to said output electrodes, whereby said amplifier and reproducer serve simultaneously for the translation of voice signals and intercommunication-signals, and means for selectively coupling said output electrode to said second portion and for simultaneously increasing the impedance of said coupling element and connecting an impedance device in series with said sound reproducer, whereby said amplifier serves as a modulation amplifier for said microphone while said system is operating as a transmitter.

9. An aircraft radio transmitter-receiver system comprising, a voice-signal carrier-frequency selecting, amplifying and detecting first portion, a carrier-frequency oscillator, modulator and power amplifier second portion, a plurality of intercommunicating stations each including a microphone and a signal reproducer, an audio-frequency amplifier having input means and output means, a circuit for applying to said input means a voice signal translated by said first portion, a circuit for simultaneously applying to said input means signals from said microphones, a signal reproducer coupled to said output means, whereby said amplifier and reproducer serve simultaneously for the translation of voice signals and intercommunication-signals, and means for selectively coupling said output means to said second portion and for disconnecting all but one of said microphones from said system, whereby said amplifier serves as a modulation amplifier for said microphone and said intercommunicating stations are disabled while the system is operating as a transmitter.

10. A radio receiver comprising a voice-signal carrier-frequency selecting, amplifying and detecting first portion, an intercommunicating microphone, an audio-frequency amplifier having a tube with grid, anode and cathode electrodes, a circuit for applying to said grid electrode a voice signal translated by said first portion, a circuit including a low-impedance coupling element connected to said cathode electrode, means connected to said microphone and inductively coupled to said low-impedance coupling element for applying to said amplifier a signal from said microphone, the impedance of said coupling element at audio frequencies being negligible in comparison with the anode-cathode impedance of said tube and a signal reproducer coupled to said output electrode, whereby said amplifier and reproducer serve simultaneously for the translation of voice signals and intercommunication signals.

DONALD H. MITCHELL.

REFERENCES CITED

The following references are of record in the file of this patent:

UNITED STATES PATENTS

| Number | Name | Date |
| --- | --- | --- |
| 1,922,415 | Bank | Aug. 15, 1933 |
| 2,107,155 | Kleinkauf et al. | Feb. 1, 1938 |
| 2,127,816 | Holst et al. | Aug. 23, 1938 |
| 2,221,398 | Geohegan | Nov. 12, 1940 |
| 2,222,761 | Beizer et al | Nov. 26, 1940 |
| 2,230,546 | Roth | Feb. 4, 1941 |
| 2,289,444 | Mayr | July 14, 1942 |
| 2,312,203 | Wallace | Feb. 23, 1943 |
| 2,366,329 | George | Jan. 2, 1945 |
| 2,432,560 | Crooks | Dec. 16, 1947 |
| 2,455,711 | Sziklai | Dec. 7, 1948 |

OTHER REFERENCES

"Principles of Aeronautical Radio Engineering" by Sandretto published by McGraw-Hill Co., New York, N. Y., 1942, pages 366-379.